June 13, 1961 A. J. LINCOLN ET AL 2,988,668

HIGH SPEED MEMORY

Filed Oct. 5, 1954

INVENTORS
ANDREW J. LINCOLN
DAVID LOEV
GEORGE E. LUND
BY Leo Wilder
ATTORNEY

2,988,668
HIGH SPEED MEMORY

Andrew J. Lincoln, Philadelphia, and George E. Lund, Havertown, Pa., and David Loev, Great Neck, N.Y., assignors to Burroughs Corporation, Detroit, Mich., a corporation of Michigan Filed Oct. 5, 1954, Ser. No. 460,464
28 Claims. (Cl. 315—13)

This invention relates to a high speed memory or storage system, and more particularly to an improved storage particularly adapted for high speed computer usage.

High speed memories for electronic digital computers have heretofore mostly been of two fundamental types, the electrostatic and the magnetic. The electrostatic storage tube memory, usually embodied in the cathode ray tube structure, has the advantage of a fast access time, but requires constant regeneration of the stored data due to the inherent volatility of this storage technique. In addition, the system has a high cost per "bit" of stored information and requires a considerable amount of external circuitry. Conversely, the magnetic memory, usually embodied in magnetic core matrices or rotatable magnetic drums, has a relatively slow access time due to external switching circuits or speed of moving parts, but the data stored thereby is non-volatile or permanent and therefore requires no regeneration.

It is accordingly a primary object of the present invention to combine in a single system the advantages of the electrostatic and magnetic storage systems while concurrently eliminating their accompanying disadvantages.

Another object of the invention is to provide an improved method of and apparatus for switching the state of magnetic storage elements and for sensing any change of state therein.

Another object of the invention is to provide a system through the utilization of which magnetic storage elements may be fabricated quickly and accurately and at a low cost.

For a greater appreciation of these and other objects of the invention reference is made to the following specification and accompanying drawing wherein.

Figure 1:
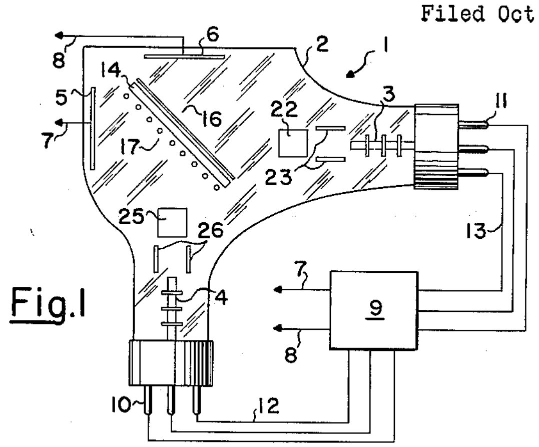
FIG. 1 is a diagrammatic view in side elevation of a cathode ray tube constructed in accordance with the instant invention.

For accomplishing the objects of the invention, there is shown in FIG. 1 an embodiment wherein a dual cathode ray tube is employed in which two separate electron beams are formed with one beam serving to store or "write" data and the other to sense or "read" data. It will become apparent that either electron beam forming means may be used independently if some other means assumes the function of the second beam forming means.

A memory system constructed in accordance with the instant invention may therefore comprise a dual cathode ray tube with the respective electron guns positioned at substantially right angles to one another. The storage member comprises a magnetic material such as ferrite or magnetic oxide having a plurality of perforations arranged in rows and columns. A ceramic or other non-ferrous reinforcing plate may be added to the storage member in order to lend rigidity to the magnetic material. The member is placed inside the tube and so oriented with respect to the electron beams from the two guns that the beams will pass through the various perforations in opposite directions. When the "write" gun is activated, its electron beam will drive the magnetic material proximate to the perforations through which it passes toward positive saturation. Conventional circuitry is utilized to control the beam and determine the specific perforations through which it will pass. When the "read" gun is activated, its electron beam during the scanning operation will pass through the perforations in a direction opposite to that of the "write" beam. Accordingly, the "read" beam will tend to drive the magnetic material toward negative saturation. When the beam passes through a perforation whose associated magnetic material had previously been driven positive, a greater than normal amount of energy will be required to drive the material negative. This abnormal expenditure of energy will affect the potential gradient in the vicinity of the perforation so as to locally increase the gradient. This abnormal gradient may be measured, using the normal gradient as a datum, and the perforations into which "bits" of information were previously written is determined by comparison.

Referring now more particularly to the drawing, the numeral 1 broadly designates a cathode ray tube having an envelope 2 which may be of glass or other suitable material. Cathodes 3 and 4 are respectively set at right angles to one another in elongated protrusions of the envelope 2 with their associated anodes 5 and 6 being respectively located diametrically opposed thereto. Leads 7 and 8 of the anodes are connected to conventional circuitry located at 9 as are pins 10 and 11 of the cathodes as indicated by the lines 12 and 13.

The storage member 14 is interposed between the cathodes 3 and 4 and their respective anodes 5 and 6 and as herein shown at an angle of 45 degrees to the longitudinal axes of the electron guns as is best seen in FIG. 1. The arrangement is such that electrons emitted by cathode 3 will pass through selected ones of perforations 15 of the storage member in one direction while in transit to anode 5, while electrons emitted from cathode 4 will pass through selected perforations in the opposite direction as they move toward anode 6.

Figure 2:
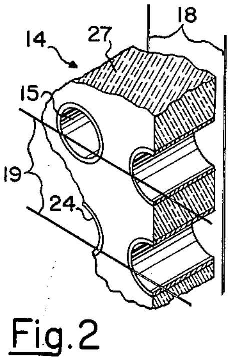
FIG. 2 is a fragmentary perspective view to an enlarged scale of the storage member and its associated grids.
Figure 3:
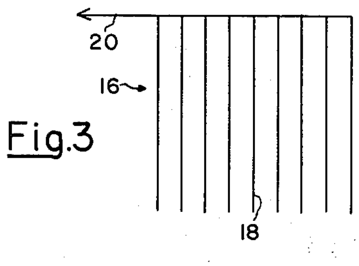
FIGS. 3 and 4 are diagrammatic views of the right and left grids respectively.
Figure 4:
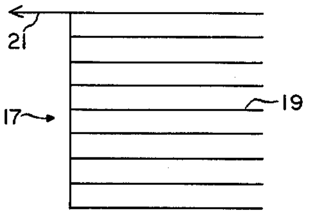

The right and left grids 16 and 17 each comprise a series of parallel wires 18 and 19 respectively of a gauge which is small compared to the diameters of the perforations 15. As is illustrated in FIGS. 1 and 2, the grid wires overlie the perforations but are not in physical contact therewith. Each wire of grid 16 overlies an individual column of perforations while each of the wires of grid 17 overlies an individual row of perforation. The arrangement is such that each perforation may be identified by the unique pair of grid wires with which it is associated. The wires of each grid are connected in parallel to conductors 20 and 21 respectively which lead to an indicator device at 9 of any conventional type suitable for indicating the potential difference between the pairs of grid wires associated with each perforation. Although the wires of each grid are for purposes of clarity herein disclosed as being parallel to each other and perpendicular to the wires of its opposite grid, it should be obvious that any geometric arrangement wherein each perforation is associated with a pair of wires, one from each grid, would be equally suitable.

When it is desired to "write" into the storage member 14, electron gun 3—7 is activated. Deflection plates 22 and 23, the connections of which to the electronic circuitry located at 9 have been omitted for purposes of clarity, deflect the beam so that it sequentially passes through predetermined perforations 15, skipping the undesired perforations in the storage member. It is understood that the magnitude of the electrostatic fields between the pairs of plates 22 and 23 which cause the deflection of the beam are controlled by the circuitry at 9 in the conventional manner.

Figure 11:
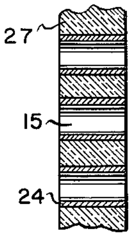
Figure 12:
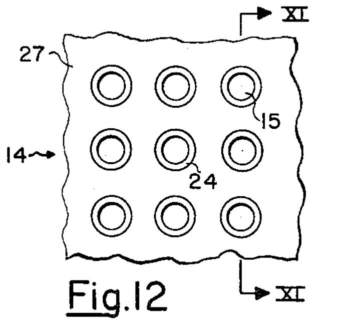

The storage member herein disclosed comprises a perforated non-magnetic plate 27 of ceramic or other suitable material having a magnetic element 24 comprising a thin coating of magnetic oxide, ferrite or other suitable material on the wall of the perforations as is illustrated in FIGS. 2, 11 and 12. As the "write" electron beam from cathode 3 passes from right to left through any given perforation, it drives the magnetic element 24 proximate to said perforation toward positive saturation. The magnetic elements proximate to those perforations which were selectively skipped by the "write" beam will remain undisturbed in their normal state of negative saturation.

When it is desired to "read" from the storage member, electron gun 4—6 is activated. Deflection plates 25 and 26, the magnitude of whose electrostatic fields are controlled by the circuitry at 9, deflect the "read" beam in such a manner that it scans the entire storage member, sequentially passing from left to right through every perforation contained therein. As the "read" beam passes through those perforations which were previously skipped by the "write" beam, there is no appreciable effect upon the electrons comprising the beam nor upon the potential gradient since the magnet elements proximate to the above mentioned perforations are in a state of polarization compatible with the direction of flow of the beam. However, when the "read" beam passes through a perforation about which the "write" beam previously stored a "bit" of information, it enters a magnetic field which tends to oppose the movement of the electrons to their anode 6. This situation results from the fact that the "write" beam had previously passed through the perforation in a direction opposite to that now being taken by the "read" beam, and while doing so polarized the magnetic element in a direction which would cause its field to resist an electric current moving in the direction of the "read" beam. As the "read" beam moves through the perforation about which the intelligence is stored, it drives the positively saturated magnetic element in a negative direction and dissipates energy in the process. This causes the electrons to be at a much lower energy level upon leaving the perforation than is normal. As a result, a greater potential difference exists between the grid wires associated with the perforation than is the case when the "read" beam passes through a perforation in which no information is being stored. The increased potential difference is transmitted by conductors 20 and 21 from the grids to the circuitry at 9 where it is indicated and interpreted in a conventional manner forming no part of the present invention.

Figure 5:
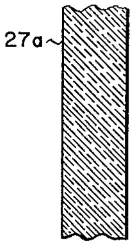
FIGS. 5, 6, 7 and 8 illustrate the manner in which the storage member of FIG. 2 may be fabricated, with FIG. 7 being a view taken along line VII—VII of FIG. 8; and, FIGS. 9, 10, 11 and 12 taken in conjunction with FIG. 5 illustrate an alternative method of fabricating the storage member, with FIG. 11 being a view taken along line XI—XI of FIG. 12.
Figure 6:
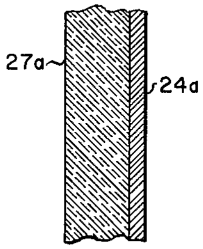
Figure 7:
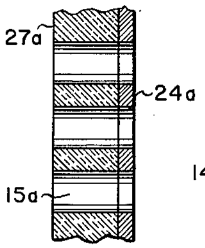
Figure 8:
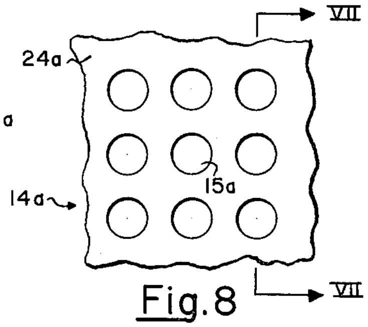

Referring now more particularly to FIGS. 5 through 8 wherein a mode of fabricating the storage member **14*a* is illustrated, it may be seen that the initial work piece 27*a* is an unperforated sheet of ceramic material as shown in FIG. 5 upon one of the faces of which a thin coating of ferrite 24*a* or other suitable magnetic material is deposited by means of evaporation or any other suitable process. In view of the fact that the electron beams which are intended to "write" and "read" from the storage member are in essence electric currents of minute magnitude, it is necessary that the magnetic coating 24*a* be relatively thin for any appreciable degree of magnetization to occur when the electron beam passes proximate thereto. Following the deposit of the magnetic material a series of perforations 15*a*** oriented into regularly spaced rows and columns are punched or drilled into the composite element by means of a gang punch or drill. The end result is a member having the configuration disclosed in FIGS. 7 and 8. This procedure may be followed employing ceramic plates of relatively large dimensions which after fabrication may be cut into a plurality of elements of the desired size.

Figure 9:
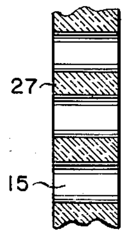
Figure 10:
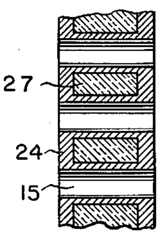

An alternative method of fabricating the storage member is disclosed in FIGS. 9 through 12 taken in conjunction with FIG. 5. Herein, the ceramic plate **27*a* of FIG. 5 is perforated initially so as to provide a member having the appearance of plate 27 as shown in FIG. 9. Magnetic material 24** such as ferrite is then deposited by way of evaporation or any other suitable means upon all surfaces of the plate so as to coat both faces of the latter as well as the inner cylindrical surface of the perforations. Subsequently, the ferrite is wiped, ground or otherwise removed from the faces of the plate so that magnetic material remains on only the wall of the perforations as is seen in FIGS. 11 and 12. Similarly to the procedure followed above, a relatively large ceramic plate may be made initially which after the coating process may be divided into a plurality of individual storage elements having the desired number of rows and columns of perforations.

By following either of the above outlined procedures, the relatively small and delicate storage element which is the heart of the non-volatile memory system may be mass-produced cheaply and quickly. Handling is cut to an absolute minimum and dimensional control may be maintained with facility.

It may therefore be seen that due to the unique method of fabrication disclosed herein, it is possible to provide in a practical and economic manner a storage element which has a coating of magnetic material sufficiently thin to make possible its magnetization to an appreciable magnitude by an electron beam; thus making possible the combining in a single system the high density, non-volatile storage which is characteristic of magnetic memory systems with the low access time inherent in electrostatic systems.

What is claimed is:

1. A cathode ray tube comprising an envelope, a source of electrons mounted within said envelope, detector means disposed in said envelope, means for causing at least some of the electrons emitted from said source to impinge on said detector, and control means mounted within said envelope between said source and said detector for interacting with the electrons travelling toward said detector to control said electrons striking said detector, said control means including a sheet-like member having a plurality of apertures therein through which electrons from said source pass in travelling to said detector, said member including a magnetically permeable material surrounding each of said apertures, and means including said magnetically permeable material for producing in the vicinity of said apertures a magnetic field which interacts with electrons passing through said apertures to control said electrons.

2. A cathode ray tube comprising an envelope, a source of electrons mounted within said envelope, detector means disposed in said envelope, means for causing at least some of the electrons emitted from said source to impinge on said detector, and control means mounted within said envelope between said source and said detector for interacting with the electrons travelling toward said detector to control said electrons striking said detector, said control means including a plate-like member having a plurality of openings therein through which electrons from said source pass in travelling to said detector, said plate-like member including a magnetically permeable material disposed adjacent each of said openings, said material which is immediately adjacent each of said openings being capable of having a substantial remanent magnetic field, and means utilizing said remanent magnetic field of said magnetically permeable material to control said electrons.

3. A cathode ray tube comprising an envelope, a source of electrons mounted within said envelope, means includig a detector disposed in said envelope responsive to a characteristic of the electrons impinging on said detector, means for causing at least some of the electrons emitted from said source to impinge on said detector, and control means mounted within said envelope between said source and said detector for controlling said characteristic of said electrons impinging on said detector, said control means including a sheet-like member having a plurality of apertures therein and including magnetically permeable material respectively surrounding said apertures, and means including said magnetically permeable material for producing in the vicinity of said apertures a magnetic field which interacts with the electrons passing through said apertures for controlling said characteristic thereof.

4. A cathode ray tube comprising an envelope, a source of electrons mounted within said envelope, means including a detector disposed in said envelope responsive to a characteristic of the electrons impinging on said detector, means for causing at least some of the electrons emitted from said source to impinge on said detector, and control means mounted within said envelope between said source and said detector for controlling said characteristic of said electrons impinging on said detector, said control means including plate-like means having a plurality of openings therein and including magnetically permeable material bounding said openings, and means including said magnetically permeable material for producing in the vicinity of said openings a magnetic field which interacts with the electrons passing through said openings for controlling said characteristic thereof.

5. A cathode ray tube comprising an envelope, a source of electrons mounted within said envelope, target means for receiving electrons emitted from said source, means for accelerating electrons emitted from said source toward said target for impingement thereon, a plate-like member positioned between said electron source and said target means, said plate-like member having a plurality of apertures therein arranged in a two dimensional array, deflection means for causing said electrons to scan said apertures to cause electrons from said source to pass successively through the apertures in travelling to said target means, and means including high permeable magnetic material adjacent each said aperture and extending contiguous and bounding each said aperture through at least a portion of its length for controlling by magnetic interaction electrons from said source on their passage through said aperture.

6. A non-volatile high speed memory system comprising, a plurality of pairs of cathodes and anodes enclosed in a non-conductive envelope, a storage member having a plurality of perforations therein and being at least partially composed of magnetic material, said magnetic material being located proximate to the perforations, means for driving an electron beam from each cathode to its associated anode, and additional means for measuring the potential difference across the storage member, said storage member being interposed between the cathodes and their associated anodes so that the electrons emitted from one cathode will pass through the perforations in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

7. A non-volatile high speed memory system comprising, a plurality of pairs of cathodes and anodes enclosed in a non-conductive envelope, a sheet-like storage member having a plurality of perforations therein and being at least partially composed of magnetic material, at least a portion of said magnetic material being located on one of the faces of said storage member proximate to the perforations, means for driving an electron beam from each cathode to its associated anode, and additional means for measuring the potential difference across the storage member, said storage member being interposed between the cathodes and their associated anodes so that the electrons emitted from one cathode will pass through the perforations in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

8. A non-volatile high speed memory system comprising, a plurality of pairs of cathodes and anodes enclosed in a non-conductive envelope, a storage member having a plurality of perforations therein and being at least partially composed of magnetic material, at least a portion of said magnetic material being located on the inner surface of the perforations, means for driving an electron beam from each cathode to its associated anode and additional means for measuring the potential difference across the storage member, said storage member being interposed between the cathodes and their associated anodes so that the electrons emitted from one cathode will pass through the perforations in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

9. A non-volatile high speed memory system comprising, a plurality of pairs of cathodes and anodes, a storage member having a perforation therethrough and being at least partially composed of magnetic material, at least a portion of said magnetic material being located proximate to the perforation, means for driving an electron beam from each cathode to its associated anode, and additional means for measuring the potential difference across the storage member, said storage member being interposed between the cathodes and their associated anodes so that the electrons emitted from one cathode will pass through the perforation in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

10. A non-volatile high speed memory system comprising, a plurality of pairs of cathodes and anodes, a sheet-like storage member having a perforation therethrough and being at least partially composed of magnetic material, at least a portion of said magnetic material being located on one of the faces of said storage member proximate to the perforation, means for driving an electron beam from each cathode to its associated anode, and additional means for measuring the potential difference across the storage member, said storage member being interposed between the cathodes and their associated anodes so that the electrons emitted from one cathode will pass through the perforation in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

11. A non-volatile high speed memory system comprising, a plurality of pairs of cathodes and anodes, a storage member containing both non-magnetic and magnetic material, a perforation in said storage member, at least a portion of the above mentioned magnetic material being located on the wall of said perforation, means for driving an electron beam from each cathode to its associated anode, and additional means for measuring the potential difference across the storage member, said storage member being interposed between the cathodes and their associated anodes so that the electrons emitted from one cathode will pass through the perforation in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

12. A non-volatile high speed memory system comprising, a plurality of pairs of cathodes and anodes, a storage member having a non-magnetic reinforcing member with a layer of magnetic material on at least one of the surfaces thereof, a perforation in said storage member, at least a portion of the above mentioned magnetic material being located proximate to said perforation, means for driving an electron beam from each cathode to its associated anode, and additional means for measuring the potential difference across the storage member, said storage member being interposed between the cathodes and their associated anodes so that the electrons emitted from one cathode will pass through the perforation in the storage member in a direction opposite to that taken by the electrons emitted by the other cathode, each of said electron beams tending to drive the magnetic material proximate to the perforation through which it is passing toward a state of magnetic saturation opposite to that induced by the other of said beams.

13. A non-volatile high speed memory system comprising, a plurality of pairs of cathodes and anodes, a storage member having a perforation therethrough and being at least partially composed of magnetic material, at least a portion of said magnetic material being located on the inner surface of the perforation, means for driving an electron beam from each cathode to its associated anode, and additional means for measuring the potential difference across the storage member, said storage member being interposed between the cathodes and their associated anodes so that the electrons emitted from one cathode will pass through the perforation in the storage member in a direction opposite to that taken by the electrons emitted from the other cathode, each of said electron beams tending to drive the magnetic material proximate to the perforation through which it is passing toward a state of magnetic saturation opposite to that induced by the other of said beams.

14. A high speed memory system comprising, a bistable magnetic element being capable of assuming one or the other of two stable states of magnetization and of being switched from one to the other of such states, means predisposing the magnetic element in an electrostatic field, and means for generating and directing an electron beam through the magnetic element to switch the element from one stable state to the other state.

15. A high speed memory system comprising, a bistable element formed of an annular core of magnetic material having the capability of assuming one or the other of two stable states of magnetization and of being switched from one stable state to the other, means predisposing the above mentioned element in an electrostatic field, and means for passing a beam of electrons through the annular core for the purpose of switching the core from one stable state of magnetization to the other state.

16. A high speed memory system comprising, a bistable magnetic element having an electron beam permeable area therein, means predisposing the magnetic element in an electrostatic field, and means for passing an electron beam through the beam permeable area of the magnetic element for the purpose of switching the element from one stable state to the other state.

17. A method of high speed recordation comprising the steps of polarizing a bi-stable magnetic element and passing an electron beam through a beam permeable area in the element for the purpose of switching the element from one stable state to the other state.

18. A storage element for a non-volatile high speed memory system comprising a non-magnetic member, a perforation in said member, and a coating of magnetic material having the capability of assuming one or the other of two stable states of magnetization and of being switched from one such stable state to the other and covering substantially the entire inner wall surface of said perforation.

19. A high speed memory system comprising, a bistable element formed of an annular core of magnetic material having the capability of assuming one or the other of two stable states of magnetization and of being switched from one stable state to the other, means predisposing the above mentioned element in an electrostatic field, means for passing a beam of electrons through the annular core for the purpose of switching the core from one stable state of magnetization to the other state, and means in the vicinity of the bi-stable element and sensitive to changes in its magnetization for detecting a change of the element from one of its stable states of magnetization to the other state.

20. A high speed memory system comprising, a bistable magnetic element having an electron beam permeable area therein, means predisposing the magnetic element in an electrostatic field, means for passing an electron beam through the beam permeable area of the magnetic element for the purpose of switching the element from one stable state to the other state, and means for detecting a change from one to the other of the two stable states of magnetization of the magnetic element.

21. A storage element for a non-volatile high speed memory system comprising, in combination, a compound member containing both non-magnetic and magnetic material, said magnetic material being bistable in character and capable of remaining in each stable state of its magnetization until switched to the other stable state, and a perforation in said compound member, as least a portion of the magnetic material being located on the inner wall surface of said perforation.

22. A non-volatile high speed memory system comprising, in combination, a cathode ray type of tube assembly including a cathode and an anode and an envelope enclosing the operating elements of the assembly to seal the same from the atmosphere, a storage member in the envelope interposed between the cathode and the anode and having a perforation therethrough and being at least partially composed of magnetic material having the capability of being switched from one to the other of two stable states of magnetization, at least a portion of said magnetic material being located proximate to the perforation, means for forming an electron beam between the cathode and anode and for causing the beam to pass through the perforation in the storage member, said electron beam acting to drive said magnetic material to one of its stable states of magnetization, and means for driving said magnetic material to its other state of stable magnetization.

23. The invention described in claim 22 characterized in that means is provided in the vicinity of said perforation for sensing a change in the magnetization of the magnetic material proximate to the perforation.

24. A non-volatile high speed memory system comprising, in combination, a tube assembly including a cathode and an anode and an envelope enclosing the assembly to seal the same from the atmosphere, a storage member in the envelope interposed between cathode and the anode and having a plurality of perforations therethrough, said storage member being at least partially composed of magnetic material located proximate to the perforations, said magnetic material having the capability of assuming one or the other of two stable states of magnetization and further having the capability of being switched from one to the other of such states, means for forming an electron beam between the cathode and anode and for causing the beam to pass through any selected one of said perforations, said electron beam acting to drive said magnetic material proximate to the perforation through which it is passing to one of its stable states of magnetization, and means for switching the magnetic material so driven by the electron beam to its other stable state of magnetization.

25. A memory system according to claim 24 wherein means is provided for detecting the switching of the portion of the magnetic material proximate to any one of the perforations from one stable state of magnetization to the other such state.

26. A storage element as set forth in claim 18 wherein said non-magnetic member is generally planar and said perforation is one of a plurality of perforations extending in parallel relationship through said member.

27. A storage element as set forth in claim 26 further comprising means for passing electrons in one direction through said perforations and means for passing electrons in an opposite direction through said perforations.

28. A storage element as set forth in claim 18 further comprising means for passing electrons in one direction through said perforation, and means for passing electrons in an opposite direction through said perforation.

References Cited in the file of this patent

UNITED STATES PATENTS

| | | |
|---|---|---|
| 2,172,738 | Levin | Sept. 12, 1939 |
| 2,444,221 | Craig | June 29, 1948 |
| 2,459,790 | Busignies | Jan. 25, 1949 |
| 2,513,743 | Rajchman | July 4, 1950 |
| 2,547,638 | Gardner | Apr. 3, 1951 |
| 2,547,838 | Russell | Apr. 3, 1951 |
| 2,637,785 | Charlin | May 5, 1953 |
| 2,668,718 | Roberts | Feb. 9, 1954 |
| 2,782,335 | Ellis | Feb. 19, 1957 |